Patented Dec. 15, 1942

2,305,263

UNITED STATES PATENT OFFICE 2,305,263

METHOD OF PRESERVING EGGS

Golden Latshaw, Pittsburgh, Pa.

No Drawing. Application September 9, 1940,
Serial No. 356,041

8 Claims. (Cl. 99—161)

This invention relates generally to a process for the treatment of eggs to effect their preservation, and it is among the objects thereof to provide a simple and effective means for subjecting freshly layed eggs to a preservation treatment by dipping them in a solution of water containing a preservative compound hereinafter described.

I have found that eggs dipped in this solution retain their quality of firmness and freshness and will particularly withstand deterioration ordinarily resulting from transportation and shipping over long routes.

Tests show that eggs dipped in a solution of water and a flaky material consisting of alkali metal meta or pyrophosphates or mixtures thereof in a thin flaky or powdered form which may have minor proportions of crystals of a compound consisting of alkali metal orthophosphates and carbonates, when checked for quality against eggs of the same freshness and quality, would still grade extras, while undipped eggs would not grade standards.

Another test consisted of treating 50% of all eggs gathered each day for three days in such a solution, and both the dipped and undipped eggs were cased and shipped by motor truck over 300 miles of road. Upon inspection by candling, eggs showed the following grades: of 360 eggs tested, treated with the solution, 289 eggs rated specials, 71 extras and none standards; and of 360 eggs not treated with the solution, 32 tested specials, 187 extras and 114 standards.

This product has the properties of softening water containing alkaline-earth metal compounds and is capable of sequestering calcium in a but slightly ionized condition.

The preservative quality of the hereinbefore mentioned solution, when used for eggs, may be due to the sequestration of calcium, but most likely it is effective by the removal of organic substances from the egg shell and pores, which otherwise contaminate the interior of the egg.

I have found that a solution of 10% of the material, by volume, in one gallon of water, produces the degree of preservation hereinbefore demonstrated, although a solution of from 1% to 20% might be used with beneficial results.

The flaky materials herein described are found in a compound known commercially as Calgon.

I claim:

1. The method of preserving eggs which comprises dipping the eggs in a solution of water soluble alkali-metal metaphosphate of the type that sequesters calcium and water.

2. The method of preserving eggs which comprises dipping freshly layed eggs in a solution of 10% alkali metal meta phosphates in one gallon of water.

3. The method of preserving eggs which comprises dipping freshly layed eggs in a solution of 10% alkali metal pyrophosphates in one gallon of water.

4. The method of preserving eggs which comprises dipping freshly layed eggs in a solution of from 1% to 20% alkali metal meta phosphates in one gallon of water.

5. The method of preserving eggs which comprises dipping freshly layed eggs in a solution of from 1% to 20% alkali metal pyrophosphates in one gallon of water.

6. The method of preserving eggs which comprises dipping freshly layed eggs in a solution of alkali metal meta phosphates and water.

7. The method of preserving eggs which comprises dipping freshly layed eggs in a solution of alkali metal pyrophosphates and water.

8. The method of preserving eggs which comprises dipping freshly layed eggs in a solution of alkali metal meta phosphates and alkali metal pyrophosphates and water.

GOLDEN LATSHAW.